United States Patent
Dykman et al.

(10) Patent No.: US 6,887,552 B2
(45) Date of Patent: May 3, 2005

(54) STRUCTURAL HEADLINER ASSEMBLY

(75) Inventors: Michael C. Dykman, Lake Orion, MI (US); Carter S. Cannon, Ebersberg (DE); Lorraine C. Yu, Redwood City, CA (US); Gordon L. Ebbitt, Ann Arbor, MI (US); Michelle W. Jones, Southfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/324,644

(22) Filed: Dec. 19, 2002

(65) Prior Publication Data

US 2004/0119322 A1 Jun. 24, 2004

(Under 37 CFR 1.47)

(51) Int. Cl.$^7$ .......................... B32B 3/12; B60R 13/02; B29C 45/00
(52) U.S. Cl. ........................ 428/116; 428/73; 428/160; 428/423.3; 428/423.7; 428/192; 428/304.4; 296/211; 296/214; 264/85; 264/250; 264/254; 264/294; 264/45.1
(58) Field of Search .......................... 264/35, 241, 294, 264/275, 279, 85, 250, 254, 45.1, 46.4; 428/304.4, 73, 116–118, 156, 158, 159, 160, 161, 162, 192, 423.1, 423.3, 423.7; 296/211, 287.01, 214, 287.03, 287.05, 287.13; 188/377; 280/751, 748

(56) References Cited

U.S. PATENT DOCUMENTS

| | | | |
|---|---|---|---|
| 4,119,749 A | * | 10/1978 | Roth et al. .................... 428/99 |
| 4,247,586 A | | 1/1981 | Rochlin |
| 4,330,584 A | | 5/1982 | Doerer |
| 5,411,688 A | | 5/1995 | Morrison et al. |
| 5,484,186 A | | 1/1996 | Van Order et al. |
| 5,582,906 A | | 12/1996 | Romesberg et al. |
| 5,608,957 A | | 3/1997 | Hanagan |
| 5,804,262 A | | 9/1998 | Stevens et al. |
| 5,833,304 A | | 11/1998 | Daniel et al. |
| 5,845,458 A | | 12/1998 | Patel |
| 5,851,459 A | | 12/1998 | Chen |
| 5,985,189 A | | 11/1999 | Lynn et al. |
| 6,068,802 A | | 5/2000 | Berghorn et al. |
| 6,086,145 A | | 7/2000 | Wandyez |
| 6,120,090 A | | 9/2000 | Van Ert et al. |
| 6,120,091 A | * | 9/2000 | Reich et al. ................. 296/214 |
| 6,126,228 A | | 10/2000 | Davis, Jr. et al. |
| 6,150,287 A | | 11/2000 | Boyd et al. |
| 6,210,613 B1 | | 4/2001 | Stein et al. |
| 6,210,614 B1 | | 4/2001 | Gardner, Jr. et al. |
| 6,273,499 B1 | | 8/2001 | Guyon |
| 6,322,658 B1 | | 11/2001 | Byma et al. |
| 6,357,812 B1 | | 3/2002 | Adachi et al. |
| 6,368,702 B1 | | 4/2002 | Erickson |
| 6,371,548 B1 | | 4/2002 | Misaras |
| 6,378,936 B1 | | 4/2002 | Grimm et al. |
| 6,379,595 B1 | | 4/2002 | Byma et al. |
| 6,383,320 B1 | | 5/2002 | Gebreselassie et al. |
| 6,398,995 B1 | | 6/2002 | Eisenlord et al. |
| 6,409,210 B1 | * | 6/2002 | Emerling ................. 280/730.2 |
| 6,409,947 B1 | | 6/2002 | Wandyez |
| 6,413,613 B1 | | 7/2002 | Byma |
| 2001/0042935 A1 | | 11/2001 | Barber et al. |
| 2002/0017734 A1 | | 2/2002 | Sugihara et al. |
| 2003/0164218 A1 | * | 9/2003 | Brahm et al. ............... 156/73.5 |

FOREIGN PATENT DOCUMENTS

| | | |
|---|---|---|
| EP | 0 668 476 A1 | 8/1995 |
| JP | 63-176757 | 7/1988 |

* cited by examiner

Primary Examiner—Jennifer McNeil
(74) Attorney, Agent, or Firm—Bill C. Panagos

(57) ABSTRACT

A headliner assembly, for use with a vehicle having a roof, includes a headliner body that is positionable proximate the roof, and a support frame attached to the headliner body. The support frame cooperates with the headliner body to provide a sufficient structural characteristic such that the headliner assembly is self-supporting.

26 Claims, 2 Drawing Sheets

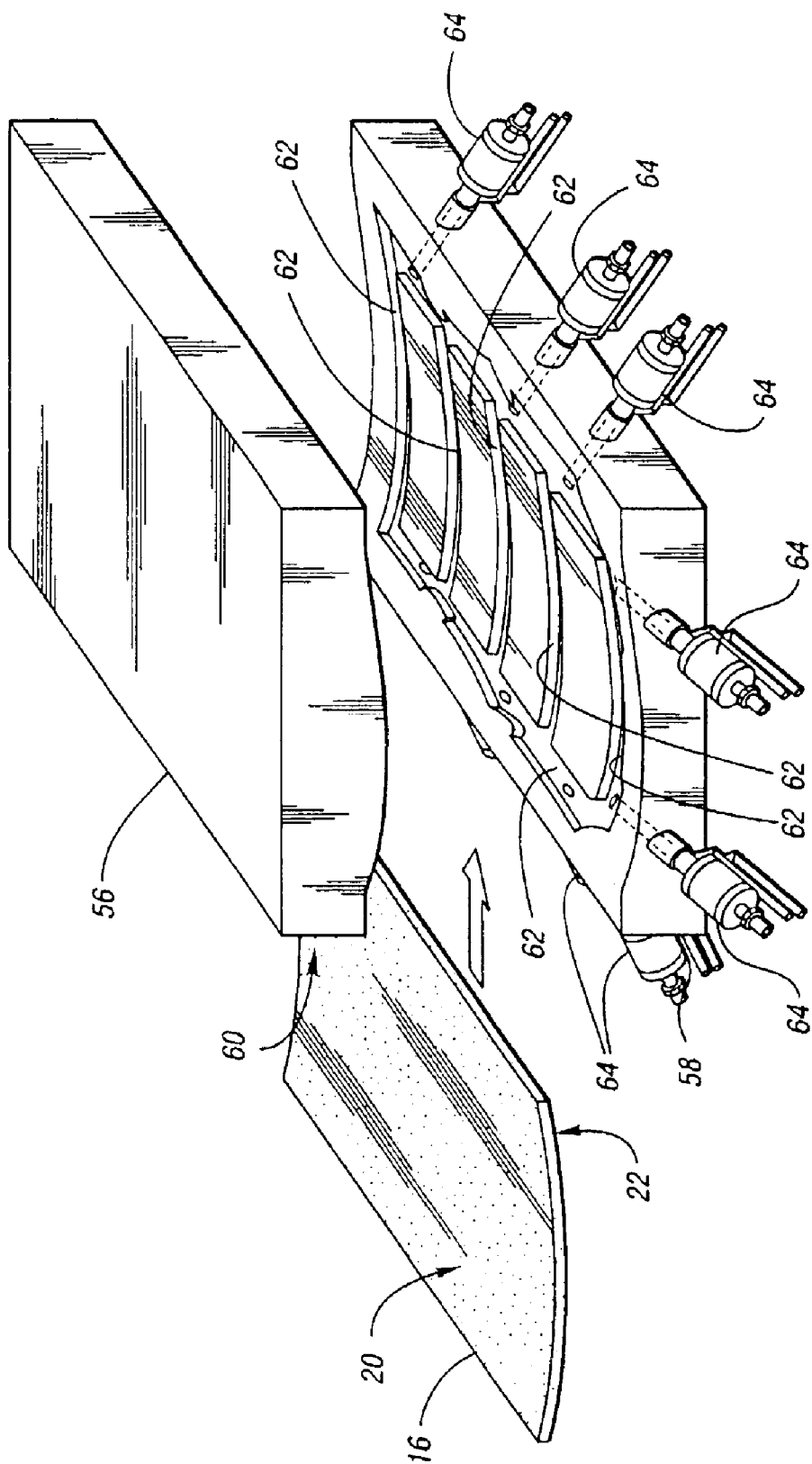

STRUCTURAL HEADLINER ASSEMBLY

BACKGROUND OF THE INVENTION

1. Field of the Invention

The invention relates to headliner assemblies for use with motor vehicles.

2. Background Art

Headliner assemblies for use with motor vehicles are known. Examples of such assemblies are disclosed in U.S. Pat. Nos. 4,247,586 and 5,845,458.

SUMMARY OF THE INVENTION

Under the invention, a headliner assembly is provided for use with a vehicle having a roof. The headliner assembly includes a headliner body that is positionable proximate the roof, and a support frame attached to the headliner body. The support frame cooperates with the headliner body to provide a sufficient structural characteristic such that the headliner assembly is self-supporting.

Further under the invention, a method of making a headliner assembly for use with a vehicle is provided. The method includes forming a headliner body into a desired shape, and attaching a support frame to the headliner body such that the support frame cooperates with the headliner body to provide a sufficient structural characteristic to enable the headliner assembly to be self-supporting.

BRIEF DESCRIPTION OF THE DRAWINGS

FIG. 5 is a perspective view of a mold that may be used to form the headliner assembly.

DETAILED DESCRIPTION OF THE PREFERRED EMBODIMENT(S)

Figure 1:
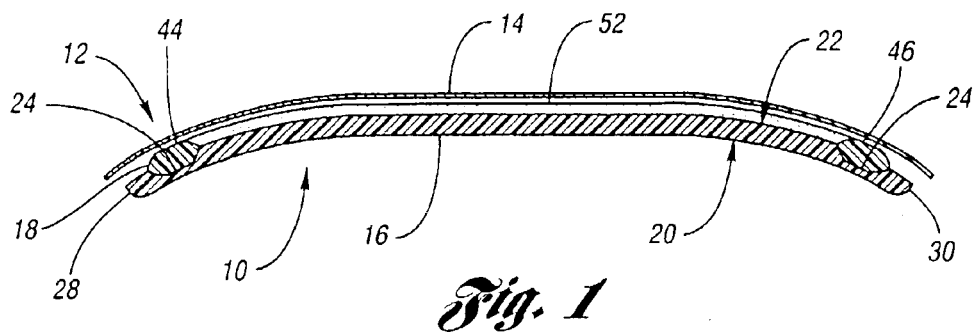
FIG. 1 is a cross-sectional view of a headliner assembly according to the invention positioned proximate a vehicle roof.
Figure 2:
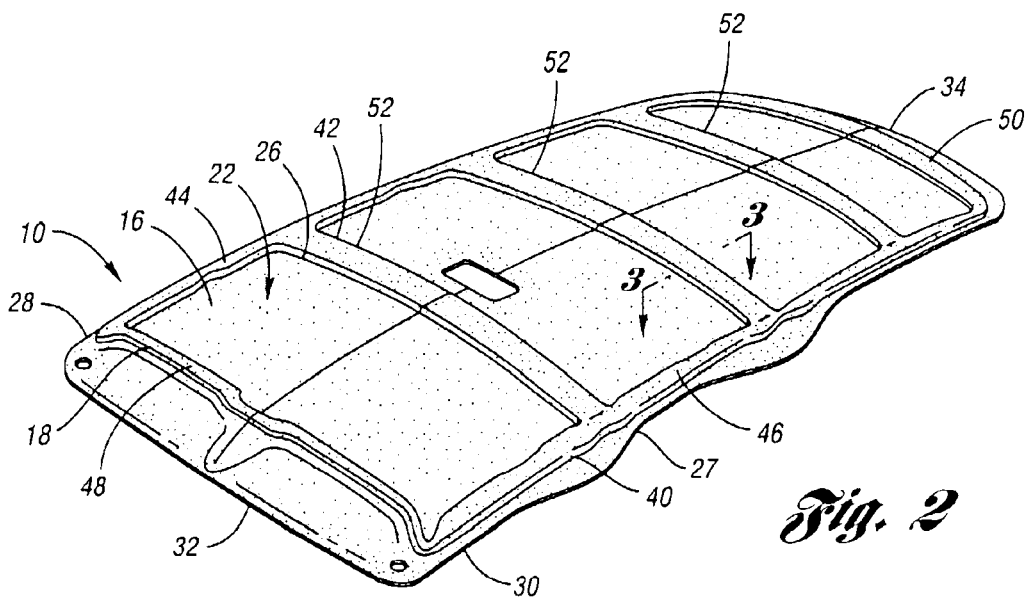
FIG. 2 is a top perspective view of the headliner assembly.

FIG. 1 shows a headliner assembly 10, according to the invention, for use with a motor vehicle 12 having a roof 14. Referring to FIGS. 1 and 2, the headliner assembly 10 includes a headliner body 16 that is positionable proximate the roof 14, and a support frame 18 attached to the headliner body 16.

The headliner body 16 has an appearance surface 20 that faces away from the roof 14, and a concealable surface 22 that faces toward the roof 14 when the headliner assembly is installed in the vehicle 12. In the embodiment shown in FIGS. 1 and 2, the concealable surface 22 defines one or more recesses 24 and 26 for receiving the support frame 18. The headliner body 16 further has a periphery 27 including first and second side edges 28 and 30, respectively, and front and rear edges 32 and 34, respectively.

The headliner body 16 may comprise any suitable material or materials, and may be made in any suitable manner. For example, referring to FIG. 3, the headliner body 16 may include a core 36 that is made of polyethylene terephthalate or urethane, and a cover material 38, such as polyester or polypropylene cloth, attached to the core 36 with an adhesive, such as adhesive film 39. Furthermore, the core 28 may comprise one or more layers.

The support frame 18 is configured to cooperate with the headliner body 16 to provide a sufficient structural characteristic such that the headliner assembly 10 is self-supporting. More specifically, the support frame 18 may be configured to sufficiently inhibit sag and/or buckling of the headliner body 16 such that the headliner assembly 10 can support its own weight without significantly sagging or buckling. With such a configuration, the headliner body 16 may be made of light weight, relatively low strength materials. In addition, the number of attachment points between the headliner assembly 10 and the roof 14 may be reduced. Furthermore, the support frame 18 may have sufficient strength to support the weight of other components attached to the headline body 16 and/or support frame 18, such as dome lights, sun visor assemblies, etc.

While the support frame 18 may have any suitable configuration, in the embodiment shown in FIG. 2, the support frame 18 has an outer frame portion 40 disposed proximate the periphery 27 of the headliner body 16, and an inner frame portion 42 attached to the outer frame portion 40. The outer frame portion 40 includes first and second longitudinally extending side support members 44 and 46, respectively, disposed proximate the first and second side edges 28 and 30, respectively, of the headliner body 16, and front and rear laterally extending support members 48 and 50, respectively, disposed proximate the front and rear edges 32 and 34, respectively, of the headliner body 16.

The inner frame portion 42 may include one or more laterally extending support members 52 that extend between the side support members 44 and 46 of the outer frame portion 40. Furthermore, the inner frame portion 42 may be attached to the outer frame portion 42 in any suitable manner, such as with adhesive and/or by a vibration weld process. Alternatively, the inner frame portion 42 may be formed integrally with the outer frame portion 40. In other words, the entire support frame 18 may be formed as a single piece or part.

Although not required, in the embodiment shown in FIG. 2, each support member 48-52 defines a beam that extends over a major dimension of the headliner body 16. In other words, each side support member 44 and 46 extends along more than half the length of the headliner body 16, and each laterally extending support member 48, 50 and 52 extends along more than half the width of the headliner body 16. Furthermore, although not shown in the Figures, it should be understood that each side support member 44 and 46 and each laterally extending support member 48, 50 and 52 may also extend diagonally.

As an example of another configuration, the support frame 18 may be provided with a central longitudinally extending support member (not shown), and one or more laterally extending support members that branch off of, or otherwise extend from, the central support member. Generally, then, the support frame 18 may include one or more longitudinally extending support members and/or one or more laterally extending support members. Furthermore, each longitudinally extending support member and each laterally extending support member may also extend diagonally.

Figure 4:
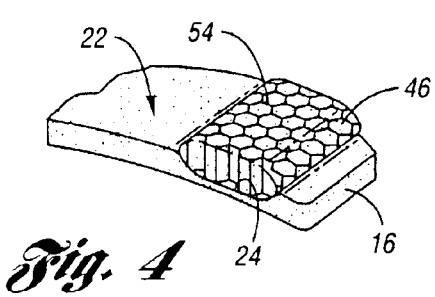
FIG. 4 is a fragmentary perspective view of a front portion of the headliner assembly.

The support frame 18 may comprise any suitable material or materials that are sufficiently rigid so that the support frame 18 may provide the structural characteristic described above in detail. For example, the support frame 18 may be made of one or more plastic materials, such as polyurethane, polypropylene and/or polyester. As a more specific example, the support frame 18 may be made of polyurethane foam and/or expanded polypropylene beads. In one embodiment of the invention, one or more or all of the support members 44–52 may have a honeycomb structure including multiple vertically or horizontally oriented cells. Referring to FIG. 4, for example, a portion of the second side support member 46 is shown with a honeycomb structure having multiple vertically oriented cells 54. Such a honeycomb structure may comprise any suitable material or materials, such as polypropylene and/or other plastic material.

In addition to providing the structural characteristic described above, the support frame 18 may also be configured to provide an energy management characteristic. More specifically, each of the support members 44–52 may function as an energy absorbing member for absorbing energy associated with a head impact. For example, if the support frame 18 comprises foam, the foam may compress during a head impact. As another example, if the support frame 18 comprises a honeycomb structure, the honeycomb structure may collapse during a head impact.

A method of manufacturing the headliner assembly 10 will now be described in detail. First, the headliner body 16 may be formed into a desired shape using any suitable means, such as a mold. For example, the headliner body 16 may be formed with a non-planar shape that conforms to the roof 14. Furthermore, the headliner body 16 may be formed such that the concealable surface 22 includes the recesses 24 and 26, if desired.

Next, the support frame 18 may be positioned in the recesses 24 and 26, and attached to the headliner body 16 in any suitable manner. For example, the support frame 18 may be vibration welded to the concealable surface 22 and/or adhesively attached to the concealable surface 22. Furthermore, the support members 44–52 may be disposed partially or entirely in the recesses 24 and 26 after attachment to the headliner body 16.

Under this approach, the support frame 18 may be preformed into a desired shape prior to attachment to the headliner body 16. For example, the support frame 18 may be preformed using any suitable molding process, such as an injection molding process, compression molding process, blow molding process, vacuum molding process, etc.

Alternatively, the support frame 18 may be formed directly onto the concealable surface 22 of the headliner body 16. Referring to FIG. 5, for example, the support frame 18 may be simultaneously formed on and attached to the headliner body 16 using an injection molding process. Under this approach, the preformed headliner body 16 may be positioned between first and second mold portions 56 and 58 of a mold 60. Second mold portion 58 has multiple recesses 62 that are in fluid communication with one or more injection devices, such as pour heads 64. The mold portions 56 and 58 are then closed together, and a moldable material, such as polyurethane, polypropylene and/or polyester, is introduced into the recesses 62 by the pour heads 64 so as to form the support frame 18. In one embodiment of the invention, the pour heads 64 are configured to introduce foam, such as a mixture of isocyanate and resin, into the recesses 62.

If the headliner body 16 is provided with recesses 24 and 26, and if the support frame 18 is not required to extend above or beyond the recesses 24 and 26, then the second mold portion 58 may be provided without recesses 62. Furthermore, with the mold configuration shown in FIG. 5, no significant shaping of the headliner body 16 occurs when the mold portions 56 and 58 are closed together.

Figure 3:
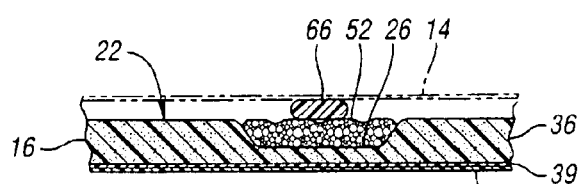
FIG. 3 is a fragmentary cross-sectional view taken along line 3—3 of FIG. 2 and viewed in a direction perpendicular to the arrows.

Additional components may also be attached to the headliner body 16 and/or support frame 18, if desired. The headliner assembly 10 may then be attached to the roof 14, or other vehicle structure, in any suitable manner. For example, the support frame 18 may be to the roof 14 with adhesive 66, as shown in FIG. 3. As another example, fasteners, such as clips, may be used to secure the headliner body 16 and/or support frame 18 to the roof 14.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A headliner assembly for use with a vehicle having a roof, the headliner assembly comprising:

a headliner body that is positionable proximate the roof, the headliner body having a length and width; and a support frame attached to the headliner body, the support frame cooperating with the headliner body to provide a sufficient structural characteristic such that the headliner assembly is self-supporting, the support frame including multiple support members that each extend along more than half the length or width of the headliner body, the support frame further comprising a honeycomb structure that is configured to provide an energy management characteristic.

2. The headliner assembly of claim 1 wherein the support frame defines an energy absorbing member proximate an edge of the headliner body.

3. The headliner assembly of claim 1 wherein the support frame comprises a plastic.

4. The headliner assembly of claim 3 wherein the support frame comprises polyurethane foam.

5. The headliner of claim 3 wherein the support frame comprises expanded polypropylene beads.

6. The headliner of claim 3 wherein the headliner body comprises polyethylene terephthalate.

7. The headliner of claim 3 wherein the headliner body comprises urethane.

8. The headliner assembly of claim 1 wherein the headliner body has an appearance surface that is adapted to face away from the roof, and a concealable surface that is adapted to face toward the roof, the concealable surface defining a recess, and wherein the support frame is attached to the concealable surface and disposed at least partially in the recess.

9. The headliner assembly of claim 1 wherein the multiple support members include at least one longitudinally extending member and at least one laterally extending member attached to the longitudinally extending member.

10. The headliner assembly of claim 1 wherein the headliner body has a periphery and the multiple support members include first and second side members disposed proximate the periphery, and at least one laterally extending member extending between and attached to the side members.

11. A headliner assembly for use with a vehicle having a roof, the headliner assembly comprising:

a headliner body that is positionable proximate the roof, the headliner body having a concealable surface adapted to face toward the roof, the concealable surface defining multiple recesses, the headliner body further having first and second side edges; and a plastic support frame attached to the headliner body such that the support frame extends into the recesses, the support frame including first and second side support members disposed proximate the first and second side edges, respectively, of the headliner body, and multiple laterally extending support members that each extend between the side support members from the first side support member to the second side support member, the support frame cooperating with the headliner body to provide a sufficient structural characteristic such that the headliner assembly is self-supporting, the support frame further including a honeycomb structure that is configured to provide an energy management characteristic.

12. A method of making a headliner assembly for use with a vehicle, the method comprising:

forming a headliner body into a desired shape;

positioning the headliner body in a mold; and after the positioning step, introducing a moldable material into the mold to form a support frame on the headliner body such that the support frame cooperates with the headliner body to provide a sufficient structural characteristic to enable the headliner assembly to be self-supporting;

wherein the forming step comprises forming the headliner body such that the headliner body has a non-planar configuration prior to the positioning step.

13. The method of claim 12 wherein the support frame is formed on a back surface of the headliner body.

14. The method of claim 12 wherein the support frame comprises a plastic.

15. The method of claim 12 wherein the support frame comprises polyurethane foam.

16. The method of claim 12 wherein the support frame comprises expanded polypropylene beads.

17. The method of claim 12 wherein the forming step includes forming the headliner body such that the headliner body has an appearance surface that is adapted to face away from a roof of the vehicle, and a concealable surface that is adapted to face toward the roof and that defines a recess, and wherein the support frame is formed on the concealable surface such that the support frame is disposed at least partially in the recess.

18. The method of claim 12 wherein the support frame is formed to include an outer frame portion disposed proximate a periphery of the headliner body.

19. The method of claim 18 wherein the outer frame portion includes first and second side members, and the support frame is further formed to include an inner frame portion attached to the outer frame portion, the inner frame portion including at least one laterally extending member extending between the side members.

20. The method of claim 12 wherein the introducing step comprises injecting moldable material into the mold.

21. The method of claim 12 further comprising closing the mold prior to the introducing step.

22. The method of claim 21 wherein the moldable material comprises foam.

23. A method of making a headliner assembly for use with a vehicle, the method comprising:

forming a headliner body into a desired shape;

positioning the headliner body in a mold; and after the positioning step, introducing a moldable material into the mold to form a support frame on the headliner body such that the support frame cooperates with the headliner body to provide a sufficient structural characteristic to enable the headliner assembly to be self-supporting, wherein the support frame comprises expanded polypropylene beads.

24. A method of making a headliner assembly for use with a vehicle, the method comprising:

forming a headliner body into a desired shape;

positioning the headliner body in a mold; and after the positioning step, introducing a moldable material into the mold to form a support frame on the headliner body such that the support frame cooperates with the headliner body to provide a sufficient structural characteristic to enable the headliner assembly to be self-supporting, wherein the support frame is formed to include an outer frame portion disposed proximate a periphery of the headliner body, and an inner frame portion attached to the outer frame portion, and wherein the outer frame portion includes first and second side members, and the inner frame portion includes at least one laterally extending member extending between the side members.

25. A method of making a headliner assembly for use with a vehicle, the method comprising:

forming a headliner body into a desired shape;

positioning the headliner body in a mold; and after the positioning step, introducing a moldable material into the mold to form a support frame on the headliner body such that the support frame cooperates with the headliner body to provide a sufficient structural characteristic to enable the headliner assembly to be self-supporting;

wherein the introducing step comprises injecting moldable material into the mold.

26. A method of making a headliner assembly for use with a vehicle, the method comprising:

forming a headliner body into a desired shape;

positioning the headliner body in a mold;

closing the mold; and after the positioning step and the closing step, introducing a moldable material into the mold to form a support frame on the headliner body such that the support frame cooperates with the headliner body to provide a sufficient structural characteristic to enable the headliner assembly to be self-supporting.

* * * * *